United States Patent
Le Du

(10) Patent No.: US 6,179,430 B1
(45) Date of Patent: Jan. 30, 2001

(54) CONTROL PANELS, MORE PARTICULARLY FOR HEATING, VENTILATING AND/OR AIR CONDITIONING INSTALLATIONS FOR THE CABIN OF A MOTOR VEHICLE

(75) Inventor: Jean-Claude Le Du, Maurepas (FR)

(73) Assignee: Valeo Electronique, Creteil Cedex (FR)

( * ) Notice: Under 35 U.S.C. 154(b), the term of this patent shall be extended for 0 days.

(21) Appl. No.: 09/073,597

(22) Filed: May 6, 1998

(30) Foreign Application Priority Data

May 12, 1997 (FR) .................................................. 97 05891

(51) Int. Cl.⁷ ....................................................... B60H 1/00
(52) U.S. Cl. ................................. 362/29; 362/85; 362/489
(58) Field of Search ............................. 362/23, 29, 489, 362/85

(56) References Cited

U.S. PATENT DOCUMENTS

| | | | |
|---|---|---|---|
| 4,646,206 | 2/1987 | Bauer et al. | 362/29 X |
| 4,807,091 | * 2/1989 | Obata | 362/30 |
| 4,930,048 | * 5/1990 | Ito | 362/26 |
| 5,432,684 | 7/1995 | Fye et al. | 362/30 |

FOREIGN PATENT DOCUMENTS

| | | |
|---|---|---|
| 0 137 325 | 4/1985 | (EP) . |
| 0 614 779 | 9/1994 | (EP) . |
| 2 737 162 | 1/1997 | (FR) . |

OTHER PUBLICATIONS

French Search Report dated Feb. 5, 1998.

* cited by examiner

Primary Examiner—Stephen Husar
(74) Attorney, Agent, or Firm—Morgan & Finnegan LLP

(57) ABSTRACT

A motor vehicle heating, ventilating and/or air conditioning installation has a control panel comprising a light box which consists of a housing comprising a housing member with an open side closed by a front wall of the control panel, and a light source within the housing. The front wall is of translucent material made opaque on its front face except in lighting zones which define illuminated indicia. Some of the lighting zones have a first thickness, while others are of different thicknesses, so that the luminance of the lighting zones at the front face of the front wall is modified locally. In this way, imperfections in the light box arising from differences in luminance in the illuminated indicia can be compensated for.

16 Claims, 3 Drawing Sheets

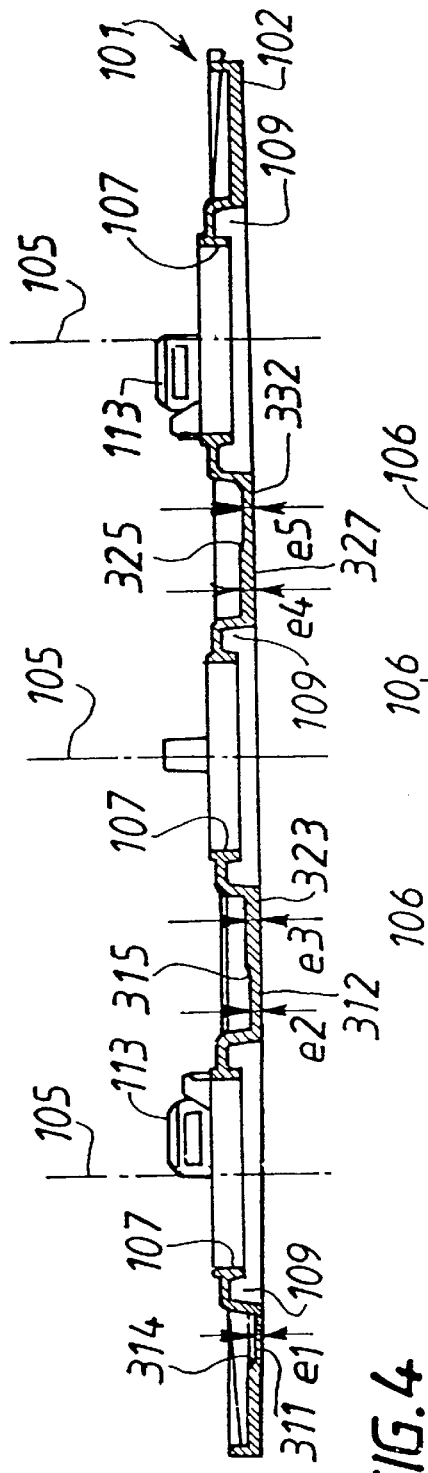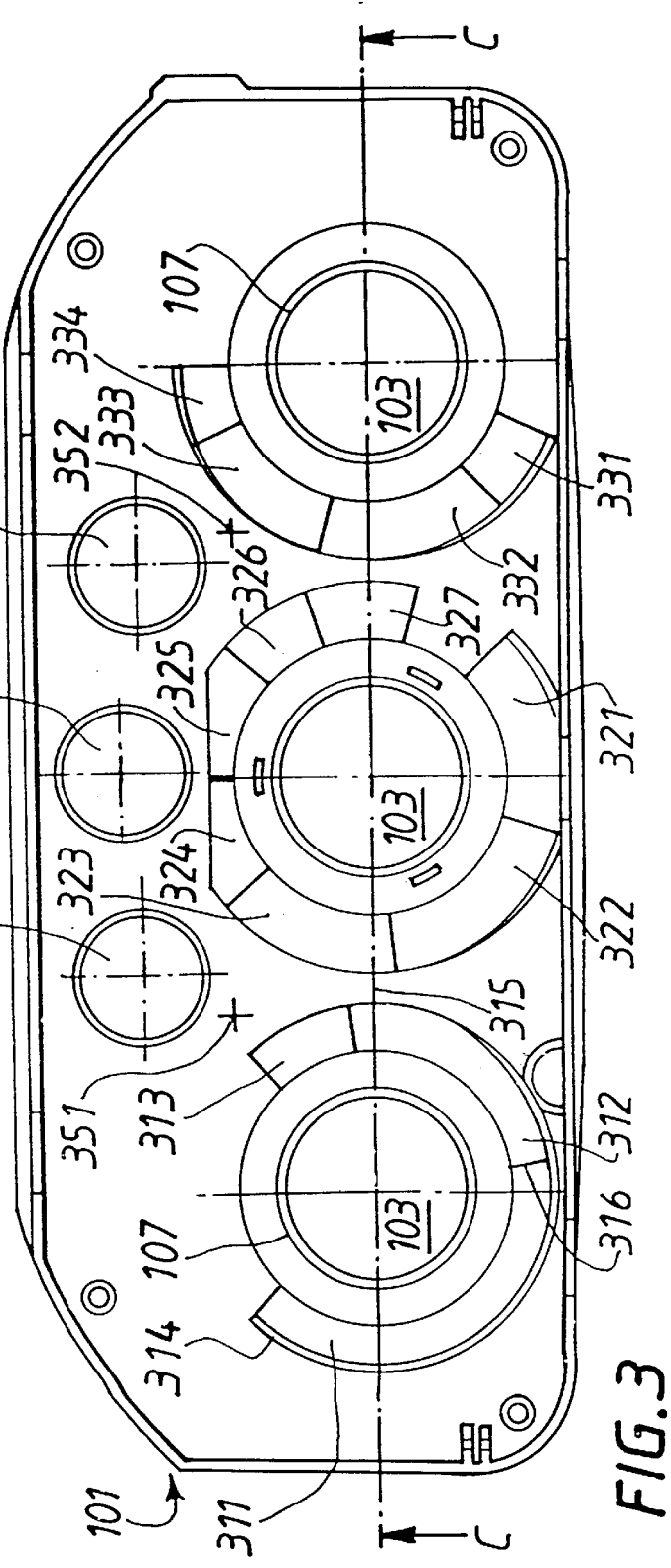
FIG.4
FIG.3

CONTROL PANELS, MORE PARTICULARLY FOR HEATING, VENTILATING AND/OR AIR CONDITIONING INSTALLATIONS FOR THE CABIN OF A MOTOR VEHICLE

FIELD OF THE INVENTION

The present invention relates to control panels, more particularly those for a heating, ventilating and/or air conditioning installation for the cabin of a motor vehicle. In particular, the invention relates to such a control panel comprising a housing which contains, mounted within it, a light source such as a lamp, the housing comprising a housing member having an open side, which is closed by a front wall member made of a translucent material which is made opaque on its front face except in predetermined lighting zones. Such a housing essentially constitutes a light box.

In this specification, the term "front" is to be understood as meaning the front as viewed by the user, so that for example, the front face of the front wall of the control panel is the face seen by the driver of the vehicle. Thus, in the terms of this specification, the front of the control panel does in fact face backwards in the vehicle. Terms such as "rear" or "behind" are to be construed accordingly.

BACKGROUND OF THE INVENTION

In conventional control panels for installations of the type mentioned above, the front face of the front wall of the light box is opaque except in predetermined lighting zones, which are for example disposed around the periphery of holes formed through the front wall for receiving control members such as rotary knobs or push buttons. These control members, whether of the mechanical or electrical type, are arranged for controlling particular functions of the installation. The lighting zones mentioned above are intended to enable the driver and/or a passenger in the vehicle to locate the appropriate control members and their respective positions, especially during night driving. The lighting zones include indicia in the form of symbols, characters or other marks, of predetermined colours such as white, orange, red and/or blue for example. It is usual generally to provide at least two different colours, red and blue being the commonest.

With these conventional arrangements, several problems arise. A first of these lies in the fact that the distribution of light behind the front wall of the control panel is never as uniform as would be obtained with an ideal light box. In this connection, it is found that the luminous intensity available at any point behind the front wall that is lit directly by the light source decreases substantially as the distance separating that point from the light source, or the closest light source, increases.

In addition, the axes of the rotary knobs, the means for guiding the push buttons, and more generally the whole of the means contained within the housing of the control panel and enabling it to function, create shadow zones behind the front wall, these being so called because they do not receive direct lighting from the light source or sources. They only receive indirect lighting produced by the rays issued from the light source after being reflected at least once from the walls of the light box (the coefficient of reflection of these walls being less than unity).

As a result, variations in luminance occur on the front face of the front wall, in particular from one point to another in the lighting zones corresponding to indicia of the same colour. It is known that luminance is a physical quantity that characterises luminous intensity per unit surface area of any light source, being expressed in candela per square metre ($cd/m^2$). In the present document, reference will sometimes be made to the luminance of the symbols considered as light sources on the front face of the front wall of the control panel.

Variations in luminance which are found to exist in practice can be as much as fivefold within a lighting zone corresponding to symbols of the same colour. Such variations in luminance are considered to be a manufacturing fault, because they detract from the appearance of the styling component of the control panel within the fascia panel of the vehicle in which it is to be mounted.

A second problem arising in conventional control panels is that lighting zones can include indicia of a first colour, for example white, while other zones contain indicia of a second colour, for example red, or a third colour, for example blue. In this connection it is well known that, in order to be visually comfortable to the user, indicia of various colours have to have different luminances at the front of the control panel.

For example, white symbols should have a luminance of the order of 8 $cd/m^2$, red symbols have a luminance of the order of 3 $cd/m^2$, and blue symbols a luminance of the order of 0.3 $cd/m^2$. The difficulty of obtaining such values of luminance at the front of the front wall of the control panel increases according to the extent to which the layers of paint used have different transmittivities, determined by their colour.

There is therefore a need to find ways, firstly to compensate for imperfections in the light box generating differences in the lighting of the front face of the front wall of the control panel, and in consequence variations in luminance in front of the front wall for lighting zones having indicia all of one colour; and secondly, if necessary, to introduce voluntarily a difference in luminance in the front of the front wall between light zones which have indicia of different colours. In other words, there exist lighting zones of a first type, the illumination of which by the light box needs to be improved, and also, light zones of a second type in which, by contrast, illumination by the light box needs to be attenuated.

In the present state of the art, it has been proposed to make use of optical bars made in a material having a refractive index greater than that of air, for guiding the light from the light source, where it is collected by a first end of the bar, to a lighting zone of the first type in which it is restituted by a second end of the bar.

Control panels have also been proposed in which the front element of the housing comprises, besides the front wall itself, an element having transmittivity which is locally variable, being for example greater in those portions which are designed to be in line with lighting zones of the first type, and smaller in those portions which are intended to be in line with lighting zones of the second type. This element may for example consist of a silk screen printed film applied on the front of the front wall.

However, these known solutions have the disadvantage that they call for additional components, which increases the cost of the control panel and makes its assembly more complex. In addition, these components cannot be used in different versions of a control panel corresponding to different levels of apparatus being controlled, and it is necessary to design them especially for each different version of the control panel.

It has also been proposed to deposit on the rear face of the front wall element a number of layers of translucent paint, this number of layers being greater in the lighting zones of the second type than in those of the first type, thus locally modifying the transmittivity of the front wall, However, this method is found to be expensive in quantity production applications, because an operation of applying paint is complex and somewhat delicate to perform.

DISCUSSION OF THE INVENTION

The object of the invention is to propose means for overcoming the above mentioned disadvantages in the state of the art.

According to the invention, a control panel, more particularly for a heating, ventilating and/or air conditioning installation for the cabin of a motor vehicle, comprising a housing element within which at least one light source is mounted, and which cooperates with a front wall element made of a translucent material which is rendered less transmissive on its front face except in predetermined lighting zones, whereby to constitute a light box, is characterised in that the front wall element is a front wall which has zones of a certain thickness and zones of a different thickness, whereby to modify locally the luminance of the lighting zones at the front of the front wall.

The invention enables the poor lighting in some zones behind the front wall (shadow zones) to be compensated for by improved transmittivity of the front wall element in those zones, without the addition of any supplementary component and without any particular surface treatment.

In addition, it is possible to introduce voluntarily, and to control, differences in luminance between lighting zones corresponding to indicia of different colours, without any particular surface treatment and without any addition of supplementary components in the front wall element.

It will be noted that the transmittivity of the front wall element is modified locally by variation in its thickness.

Preferably, the thickness of the front wall has, in line with a predetermined lighting zone, a negative gradient with respect to the distance from the closest light source. This enables the diminution in luminous intensity due to remoteness from the lamp to be compensated for. In addition, the surface of the rear face of the front wall is preferably configured in such a way as to avoid the formation of sharp angles at the joins between two different zones. In this context a sharp angle is to be understood to mean an acute angle, that is to say one defining an aperture which is smaller than that defined by a right angle.

In this way, the formation of shadow zones in front of these angles, with respect to the direction of propagation of direct rays from the light source, is avoided, as are any faults in visual appearance.

Settling back effects are also avoided. These effects are well known to those involved in moulding of plastics components by hot injection moulding: settling back arises from the difference between the cooling time and the hardening time of the material, as between thick portions and thin portions of the component, in conjunction with the contraction properties of the material during cooling.

It is also arranged that the ratio between the maximum and minimum values of the thickness of the front wall does not exceed 3.5. This ratio is preferably about 2.5.

In addition, the minimum thickness of the front wall is at least equal to 0.7 mm.

In practice, the value of the above ratio and the minimum value of the thickness will depend on the fluidity of the plastics material, the object being to avoid settling back and points of rupture in the supply of plastics material during injection into the mould.

Further features and advantages of the invention will appear more clearly on a reading of the following description of a preferred embodiment of the invention, which is given by way of non-limiting example only and with reference to the accompanying drawings.

BRIEF DESCRIPTION OF THE DRAWINGS

FIG. 3 is a rear view of the front wall in accordance with the invention.

FIG. 4 shows the same front wall, in cross section taken on the line C—C in FIG. 3.

DESCRIPTION OF A PREFERRED EMBODIMENT OF THE INVENTION

Figure 1:
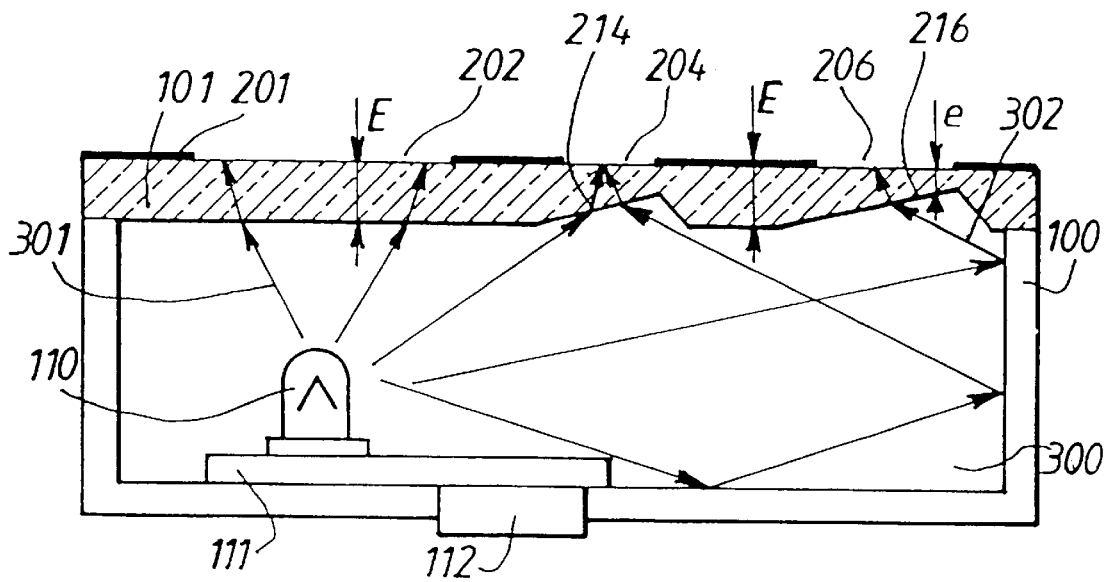
FIG. 1 is a diagrammatic view in cross section, showing a control panel and illustrating the principle of the invention.

FIG. 1 is a diagrammatic view, in cross section, of a control panel having a housing member 100, within which a light source, such as a lamp 110, is mounted. The lamp 110 is for example mounted on a printed circuit 111 which is connected to the outside of the housing 100 through an electrical connector 112. The housing member 100 is open at the front (i.e. at the top in FIG. 1) and this open front is closed by a front wall 101 which completes the housing.

The front wall 101 is made of a translucent material, for example polycarbonate coloured white, and is rendered opaque on its front face by a layer of black paint 201 which, after being applied, is etched using a method which is well known per se as "laser etching".

This layer 201 is applied in predetermined zones leaving clear lighting zones 202, 204, 206. In operation, the lighting zones allow characters or symbols to appear in a white colour, which can be lit from behind so as to appear as luminous indicia. In another version, a layer of translucent paint, for example red or blue in colour, can have been applied in some zones of the front face of the front wall 101, before application of the layer of black paint. The layer of coloured paint is not affected by the laser etching operation, so that indicia of different colours will appear on the front of the front wall. All of the above operations are well known per se, and need not be described any further here.

The housing member 100 and the front wall member 101 cooperate to form a light box 300. In the known way, the light generated by the lamp 110 is propagated within the light box 300, within which it is trapped, and it only escapes through the lighting zones 202, 204, 206. Light rays which are not directly incident on the lighting zones are reflected by the walls of the light box. Ideally, the light is propagated into all parts of the light box, and luminous intensity is uniform over the whole of the rear face of the front wall 101. In practice, the walls have a coefficient of reflection which is less than unity, so that a lighting zone 206 remote from the lamp 110 receives a luminous intensity per unit of surface area which is less than that received by a lighting zone 202 close to the lamp, being situated, for example, directly in line with the lamp 110 as shown in FIG. 1. In this connection, this second, or proximal, lighting zone 202 is lit by a major amount of light rays issuing directly from the lamp, and indicated in FIG. 1 as direct rays 301, while the remote lighting zone 206 receives only light in the form of rays which have undergone at least one reflection, as is for example indicated by the reflected rays 302 in FIG. 1.

The front wall 101 has a thickness e in the remote, or distal, lighting zone 206, which is smaller than its thickness in the close, or proximal, lighting zone 202. The filtering effect of the front wall 101, due to the fact that the polycarbonate of which it is made has a transmittivity of less than one, is therefore attenuated in the distal lighting zone 206 as compared with the proximal lighting zone 202.

In a preferred embodiment, the thickness of the front wall 101 can with advantage have, in line with a predetermined lighting zone 204 or 206, a negative gradient with respect to its distance from the lamp 110. In other words, the thickness of the front wall in the respective lighting zones decreases linearly in such a way as to be, at a predetermined point in the said zone, smaller the more the point concerned is distant from the lamp. Put another way, a local section of the front wall 101 in the zone concerned, 204 or 206, in a plane passing through the light source, has on its rear face a profile, 214 or 216 respectively, having a slope decreasing with distance from the light source. This arrangement compensates for the progressive diminution in luminous intensity due to the distance of the lighting zone concerned from the light source.

Other kinds of profile, which may or may not be linear, can of course be envisaged so as to have regard to a more complex distribution of the luminous intensity behind the lighting zone concerned, with a view to compensating for irregularities. Such a more complex distribution can for example be due to the existence within the light box of obstacles which may or may not have a screening effect on direct propagation of the light between the light source and the points concerned in the lighting zone, or to the fact that a plurality of light sources are arranged in the light box, emitting light rays which mix with varying degrees of regularity.

Figure 2:
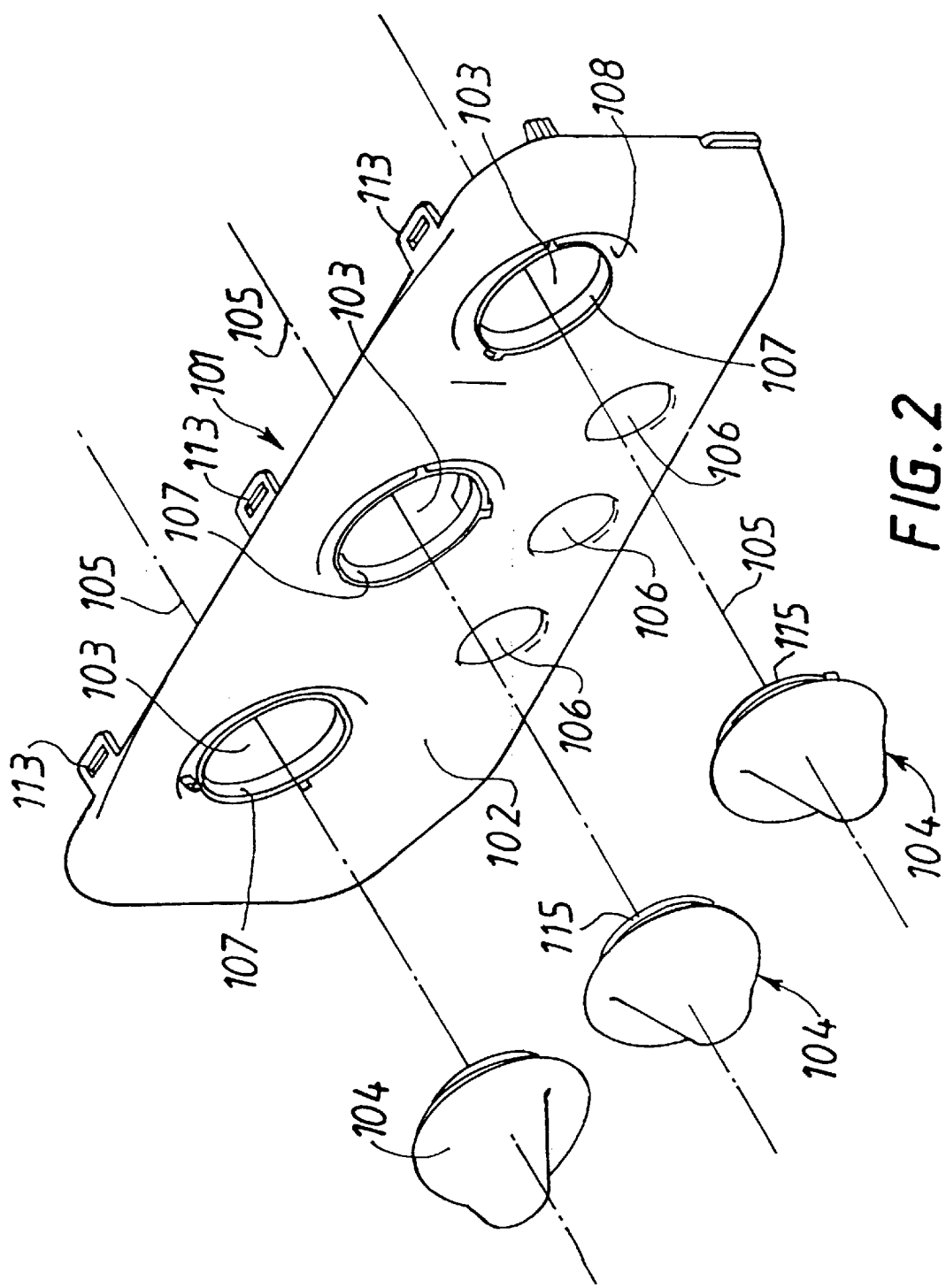
FIG. 2 is an isometric view showing the front face of the front wall of a control panel.

Reference is now made to FIG. 2, which is an isometric view showing the front or outside face of the front wall 101. The wall 101 comprises a main wall portion 102 which lies substantially in a plane, or which defines a surface which is slightly bowed towards the front, and oriented in a vertical plane when the control panel is mounted on the fascia of the vehicle. The wall portion 102 is elongate in the horizontal direction, from left to right in the vehicle, and has three similar circular holes 103 formed in it for receiving control knobs 104. The axes 105 of the three holes 103 are aligned with each other in the horizontal longitudinal direction of the wall portion 102. Three holes 106 are also formed in the wall portion 102, for containing push buttons, not shown.

Each hole 103 is bounded by a short tubular cylindrical wall portion 107, which is joined to an annular portion 108 of the wall portion 102 slightly offset towards the rear with respect to the remainder of the wall. This rearwardly offset portion defines a recess 109 (FIG. 4), in which the corresponding control knob 104 is partially received. Each knob 104 has a skirt 115 for guiding the knob in rotation within the corresponding tubular wall portion 107. The front wall 101 also includes ears 113 which cooperate with snap lugs for clipping the front wall 101 to the housing member 100, in order to complete the light box. These elements are not directly part of the invention, and need not be considered any further in this description.

Reference is now made to FIGS. 3 and 4, in which the same elements as in FIGS. 1 and 2 carry the same reference numerals. FIG. 3 is a rear elevation of the front wall 101, and FIG. 4 is a cross section on the line C—C in FIG. 3.

A lighting zone is disposed around each hole 103. Each of these lighting zones is substantially in the form of a sector of an annular crown surrounding the hole 103 concerned at a predetermined radial distance from the latter. These lighting zones consist of three groups, as follows:

a first group 311, 312, 313, arranged around the first hole which contains the mixing control knob;

a second group of lighting zones 321, 322, 323, 324, 325, 326, 327, arranged around a central second hole 103, which contains the air distribution control knob; and a third group of lighting zones 331, 332, 333, 334 arranged around the third hole 103, which contains the air flow rate control knob.

Figure 5:
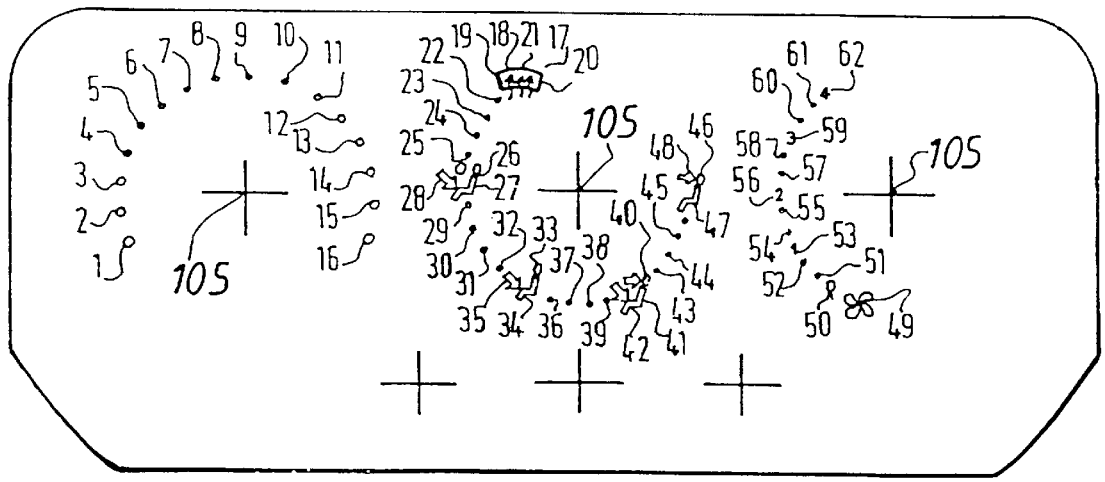
FIG. 5 shows one example of the location of indicia on the front face of the front wall.

Reference is now also made to FIG. 5, showing an arrangement of indicia on the exposed or front surface of the front wall 101. These indicia are in the various lighting zones defined above with reference to FIGS. 3 and 4.

As has been explained with reference to FIG. 1, the thickness of the front wall 101 preferably has, in a given lighting zone, a negative gradient with respect to the distance from the closest lamp.

In FIG. 3, crosses 351 and 352 mark the location of the projection, in the plane of the rear face of the front wall 101, of light sources consisting of two lamps, which are not themselves shown.

It can be seen from FIG. 4 that the main wall portion 102 of the front wall 101 has a thickness e1 in the zone 311, a greater thickness e2 in the lighting zone 312, and an even greater thickness e3 in the lighting zone 323. Similarly, the thickness e4 of the main wall portion 102 in the lighting zone 327 is greater than the thickness e5 in the lighting zone 332.

The lighting zones 321 and 331 both have the same thickness e1 as the zone 311, this thickness being constant over the whole of the surface of each of these lighting zones. This is the smallest of all the various values of the thickness of the front wall 101, because the lighting zones concerned are those which are furthest away from the lamps in the positions 351 and 352.

The lighting zones 313, 323, 326 and 333 also all have the same thickness e3 over the whole of their surface area. This thickness e3 is the greatest value of thickness applied to any of the lighting zones, because these are the zones which are closest to the light sources. On the other hand, the lighting zones 312, 322, 324, 325, 327, 332 and 334, all of which are adjacent to zones having the constant thickness e1 or the constant thickness e3 as explained above, have a thickness which varies along a negative gradient with respect to the distance from the closest light source.

The front wall 101 is made in one piece by moulding in a translucent plastics material such as polycarbonate of a white colour. Layers of coloured paint, also translucent, which in general are coloured red or blue, are applied on the front face at the locations of the lighting zones in which coloured indicia are to be shown. The whole of the surface of the front face is then covered with non-translucent black paint so as to seal the light box, this layer being laser etched in such a way as to produce the symbols which then appear white or coloured as the case may be.

Determination of the thickness required for each portion of the lighting zones is made empirically, on a once and for all basis, in the laboratory. Mathematical calculations to determine the precise values of the thickness required for the whole of the surface of the lighting zones are also possible, and this may be carried out with the aid of a computer. However, modeling of the light box is of a complexity such that it is preferable to use empirical methods.

In this method, measures of luminance are carried out at numerous precise points on the symbols, once the control panel has been fitted with a "normal" front wall, that is to say one in which the thickness is substantially constant over the whole of its extent. Referring again to FIG. 5, these points are denoted as follows in this Figure:

measuring points 1 to 6 are for example selected among the blue points, and measuring points 7 to 16 are selected among the red points for symbols corresponding to the mixing control knob;

measuring points 17 to 48 are selected among the points and symbols in the indicia corresponding to the distribution control knob; and measuring points 49 to 62 are selected among the points and symbols corresponding to the air flow control knob.

Thus, a total of 62 measurements of luminance are taken, which are obtained for the indicia on a control panel such as that shown in the drawings and described above. As a function of the luminance values obtained in each of these measurement points, a person of normal skill will be able to determine the suitable thickness for the front wall at these points, according to the known transmittivity of the material of the latter.

A mould can then be made for quantity production of the front walls, following construction of a prototype for the front wall. The prototype can be made from the original model by removal of material in such a way as to give the required results, although it may be necessary to use several successive sets of measurements of luminance. In practice, manufacturing precision in the thickness of the front wall of the order of one-tenth of a millimetre is obtained. The front wall must conserve a thickness of at least seven-tenths of a millimetre at the point of minimum thickness, so as to avoid the formation of any point of rupture in the feed of plastics material during injection into the mould.

The thickness of the front wall therefore has a maximum value of 3.5 mm, so that the ratio between maximum thickness and minimum thickness is less than 5. This also avoids any settling-back movement of the moulding material. The ratio between maximum and minimum thickness of the front wall is preferably of the order of 2.5.

Preferably, the surface of the rear face of the front wall is so configured as to avoid the formation of any sharp angles or edges, especially at the joins between two adjacent lighting zones, for example at the junction 316 between the lighting zone 311 and the zone 312, or in the portion 315 that joins the lighting zones 312 in the first group to the zone 323 in the second group. The same arrangement is also provided at the joins between the lighting zones and the remainder of the main wall portion 102 of the front wall, for example at the peripheral zone 314 around the zone 311 and part of the zone 312.

Thus, not only does the absence of sharp angles give simplified moulding of the front wall and avoid settling-back, but it also avoids the formation of shadow zones at the periphery of the lighting zones. In this connection, it will be understood that such shadow zones would appear in front of any edges with respect to the direction of propagation of the direct light from the lamp, or from the closest lamp if several of the latter are provided in the light box.

The invention significantly reduces variations in luminance in the indicia of any one colour within the lighting zones in the front of the light box. In this connection, luminance measurements carried out on a control panel equipped with a front wall according to the invention have shown variations in luminance in a ratio not greater than 1 to 2, instead of 1 to 5 with a conventional front wall.

What is claimed is:

1. A control panel for an installation for controlling the ambience in a motor vehicle cabin, the control panel comprising a light box consisting of a housing and at least one light source contained in the housing, the housing comprising a housing element having an open side and a front wall closing the said open side of the housing member, the front wall being of a translucent material with means defining predetermined lighting zones in the front wall, the said means reducing the translucence of the front wall except in the said lighting zones, wherein the lighting zones comprise at least one first zone having a first thickness and at least one second zone having a different thickness, whereby to locally modify the luminance of the lighting zones in front of the front wall.

2. The control panel according to claim 1, wherein the front wall thickness in at least one said lighting zone varies according to a negative gradient with respect to the distance of that light zone from said light source.

3. The control panel according to claim 1, wherein the front wall has a rear face having a surface configured to avoid formation of sharp angles between two different light zones.

4. The control panel according to claim 1, wherein the front wall has a minimum thickness of at least 0.7 mm.

5. The control panel according to claim 1, wherein the front wall thickness has a maximum value and a minimum value, the ratio between the values being at most 3.5.

6. The control panel according to claim 5, wherein the ratio is of the order of 2.5.

7. A method of outputting a more uniform lighting from light zones of a control panel, where the light zones are disposed around the periphery of openings in the control panel for receiving control members for controlling particular functions of installations, comprising the steps of:

providing a housing with an opening at one end and having a light source mounted inside the housing;

closing the opening end of the housing with a wall having at least one opening for receiving a control member and defined by at least two type of zones, a zone having an opaque surface and at least two light zones each having a translucent surface to allow the light source to radiate through, each type of zone having a predetermined thickness; and varying thickness of the light zone according to the distance from the light source to achieve a more uniform output of lighting from the light source through the light zone.

8. The method according to claim 7 wherein the step of varying the thickness of the light zone further comprises the step of determining the thickness of the light zone by measuring luminance from various predetermined points on the wall.

9. The method of claim 7 wherein the thickness of the light zone is varied according to a negative gradient with respect to the distance of the light zone from the light source.

10. A control panel which outputs a more uniform lighting from light zones of a control panel, where the light zones are disposed around the periphery of openings in the control panel for receiving control members for controlling particular functions of installations, comprising:

a housing with an opening at one end and a light source mounted therein;

a wall closing the opening of the housing, the wall being defined by openings for receiving control members and at least two type of zones, a zone having an opaque surface and at least two light zones having a translucent surface to allow the light source to radiate through, each type of zone having a predetermined thickness, wherein the thickness of the light zone is varied according to the distance from the light source to achieve a more uniform output of lighting from the light source through the light zones.

11. The control panel according to claim 10, wherein the thickness of each light zone varies according to a negative gradient with respect to the distance of the light zone from the light source.

12. The control panel according to claim 10, wherein the wall has a rear face having a surface configured to avoid formation of an angle less than 90° between two different light zones where the light zones are adjacent to one another.

13. The control panel according to claim 10 wherein each light zone has a minimum thickness of at least 0.7 mm.

14. The control panel according to claim 10 wherein the thickness of two light zones has a maximum value and a minimum value, the ratio between the values being at most 3.5.

15. The control panel according to claim 14 wherein the ratio is about 2.5.

16. The control panel according to claim 10 wherein the at least two light zones have an indicia of various colors having different luminance.

* * * * *